United States Patent

[11] 3,593,828

| [72] | Inventors | Hans-Christof Klein<br>Hattersheim;<br>Wilhelm Kanpp, Bad Homburg vorder Hoehe, both of, Germany |
|---|---|---|
| [21] | Appl. No. | 857,708 |
| [22] | Filed | Sept. 15, 1969 |
| [23] | | Division of Ser. No. 688,139, Dec. 5, 1967, Pat. No. 3,489,252. |
| [45] | Patented | July 20, 1971 |
| [73] | Assignee | Alfred Teves G.m.b.H.<br>Frankfurt am Main, Germany |
| [32] | Priority | Dec. 6, 1966, Apr. 28, 1967 |
| [33] | | Germany |
| [31] | | T 32 688 and T 33 750 |

[54] HYDRODYNAMIC BRAKE
3 Claims, 2 Drawing Figs.

[52] U.S. Cl. ................................. 188/274,
188/264, 188/290
[51] Int. Cl. ...................................... F16d 57/04
[50] Field of Search ............................ 188/90, 264
P

[56] References Cited
UNITED STATES PATENTS

| 2,498,572 | 2/1950 | O'Leary | 188/90 (A) |
| 2,672,953 | 3/1954 | Cline | 188/90 (A) |
| 3,142,360 | 7/1964 | Kelemen | 188/90 |
| 3,407,908 | 10/1968 | Smith | 188/90 (A) |

FOREIGN PATENTS

| 466,436 | 5/1937 | Great Britain | 188/90 (A) |
| 589,790 | 6/1947 | Great Britain | 188/90 (A) |

*Primary Examiner*—George E. A. Halvosa
*Attorney*—Karl F. Ross

ABSTRACT: A hydrodynamic brake connected with the power train or wheels of an automatic vehicle in which confronting rotors are driven in opposite senses and have interleaved arrays of axially extending vanes circulating the hydrodynamic brake fluid along a closed path in heat-transferring relationship with air induced to flow along the outer wall of the pump housing by blowers connected with the rotor shafts. The decelerator effectiveness is controlled by intercepting in a stepless manner the pumped liquid.

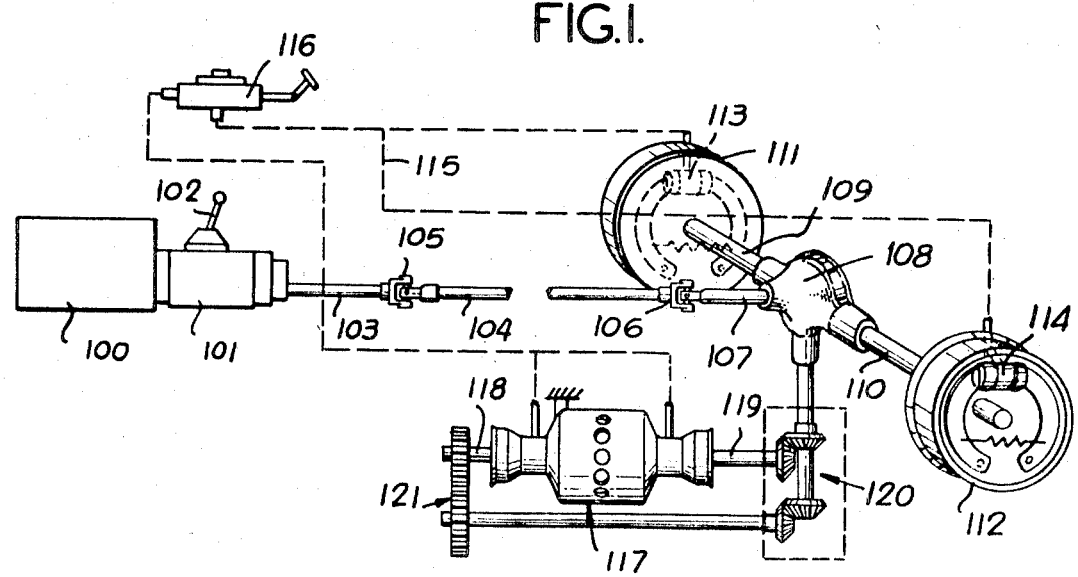
FIG.I.

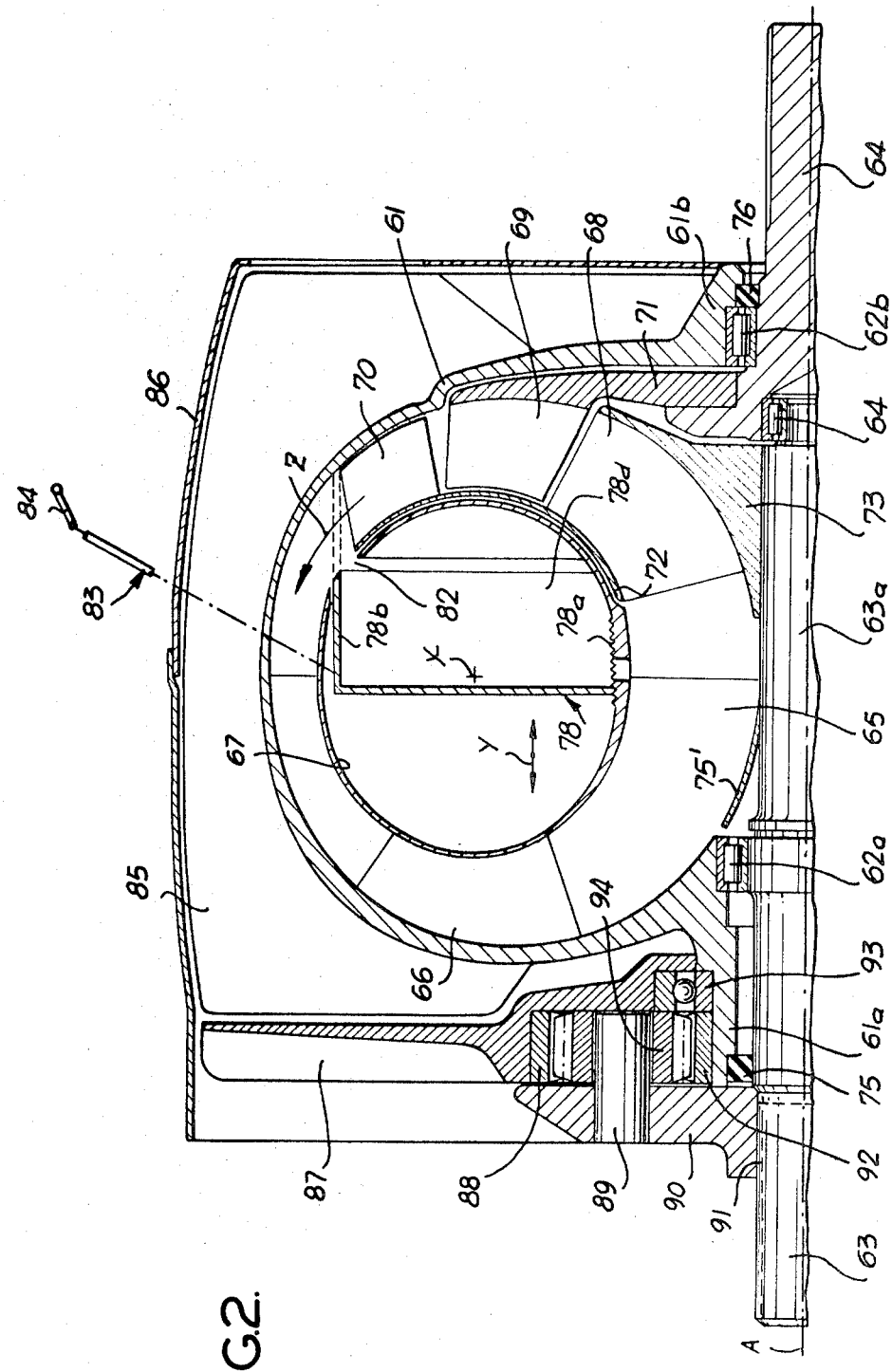

HYDRODYNAMIC BRAKE

CROSS-REFERENCE TO EARLIER APPLICATION

This application is a division of our application Ser. No. 688,139 filed Dec. 5, 1967 (now U.S. Pat. No. 3,489,252).

Our present invention relates to a hydrodynamic brake or decelerator for automotive vehicles.

BACKGROUND OF THE INVENTION

It has already been proposed to provide hydrodynamic brakes or decelerators in the driving train of an automotive vehicle, i.e. between the engine and the driven wheels, to act as an auxiliary decelerating or braking device in conjunction with the usual wheel brakes. In such systems, a rotary pumping member, i.e. a rotor connected with the drive shaft of the vehicle, displaces a hydraulic fluid along a closed path including a heat exchanger designed to dissipate the heat of the fluid produced by conversion of the kinetic energy of rotation of the shaft into kinetic energy of heat of the fluid. The resulting deceleration of the shaft is proportional to the amount of heat generated in the fluid.

In such systems, e.g. as has been described in commonly assigned U.S. Pat. Nos. 3,265,162 and 3,302,755 and in the applications Ser. Nos. 672,121 (now U.S. Pat. No. 3,451,511) and 680,936 (now U.S. Pat. No. 3,423,134) filed Oct. 2, 1967 and Nov. 6, 1967 by Wilhelm Knapp, one of the present inventors and copending with the parent application, the principle of operation and some advantageous constructions of hydrodynamic decelerations of this type are described and claimed. Thus it is important to recognize that a hydrodynamic brake is most effective at high vehicle speeds and thus may be brought into play prior to the mechanical wheel brakes of the vehicle to effect an initial slowdown at speeds at which the mechanical brakes are rapidly worn out and are of little effectiveness. However, at low vehicle speeds, the pumping efficiency falls off and the hydrodynamic decelerator plays a less significant role in the braking process. In fact, hydrodynamic decelerators alone are frequently incapable of bringing the vehicle to standstill. Thus it has been suggested to provide additional friction brakes in the decelerator housing and to use a differential valve responsive to the braking effectiveness of the hydraulic decelerator to bring the friction brakes at the wheels or decelerator housing into play.

For the most part, earlier decelerator structures have required a relatively large-diameter stator, mounted upon the vehicle frame or chassis, cooperating a corresponding dimension rotor whose vanes or ribs cooperate to form the pump. The decelerator thus had the appearance of a torque converter with a crown of vanes, the hydraulic fluid being pumped from the central region of the decelerator chamber to the periphery thereof. The rotor was generally coupled to the power shaft, while the heat exchanger was a radiator designed to dissipate the thermal energy of braking into the atmosphere directly, e.g. with the cooperation of a fan inducing the flow of air through the radiator or the vehicle movement with similar effect, or a liquid/liquid heat exchanger indirectly dissipating this thermal energy. Heat exchanger systems of the latter type make use of the cooling system of the internal-combustion engine by passing the coolant thereof through the liquid/liquid heat exchanger to take up the heat of hydrodynamic fluid and eventually dissipate it into the atmosphere through the radiator of the engine. A thermostatic switch may be provided at the heat exchanger to terminate the flow of cooling fluid therethrough when, because of the extent of braking or road conditions affecting driving, the engine is about to overheat.

It has also been found, as described in the aforementioned applications, that problems were encountered in hydraulic decelerator in which residual fluid in the pumping chamber was displaced by the rotor in spite of the fact that the rotor chamber was not intended to be charged with fluid and hydrodynamic braking was undesired. To this end, these systems provide a charging cylinder containing hydraulic brake fluid below a gas head which can be alternatively subjected to pressurization from a compressor or to negative pressure from the intake side of the compressor. When superatmospheric pressure is supplied to the charging cylinder, the hydrodynamic fluid is driven under pressure from the charging cylinder into the rotor chamber and substantially immediately becomes effective to produce hydrodynamic deceleration. When negative pressure is applied to the cylinder, however, the hydrodynamic fluid is withdrawn from the rotor chamber which is substantially completely drained to prevent undesirable pumping action.

It will be recognized that the effectiveness of the hydrodynamic decelerator is determined by the volume of the liquid pumped and the energy which is transferred to the liquid in the form of heat, i.e. by the amount of work done by the rotor in the liquid. The pumping capacity of the rotor, however, is dependent upon the speed of the power shaft, which must be held within the limited range of speeds practical for automotive vehicle, and the diameter of the rotor. As a result, it is necessary to increase the diameter (and, accordingly, the peripheral speed of the vanes) whenever increased hydrodynamic braking is desired. This provides a limitation of the use of hydrodynamic decelerators and brakes since increase in the volume of the decelerator is often precluded by design of the vehicle, may become prohibitive, or may result in interference with other functioning parts. Thus it may be stated that a recognized disadvantage of the known hydrodynamic brakes is their spatial requirements for a given decelerating action.

OBJECTS OF THE INVENTION

It is, therefore, the principal object of our present invention to provide an improved hydrodynamic decelerator for heavy duty automotive vehicles and the like which requires a minimum of room for a maximum of decelerator activity and overcomes the disadvantages of earlier systems as described above.

Another object of this invention is to provide a hydrodynamic decelerator of high effectiveness and low bulk.

Still another object of our invention is to provide a hydrodynamic decelerator of high effectiveness and facility of control.

BRIEF SUMMARY OF THE INVENTION

These objects and others which will become apparent hereinafter are attained, in accordance with the present invention, in a hydraulic decelerator adapted to circulate a liquid along a closed path to convert kinetic energy of rotation in the power train of a vehicle into kinetic energy of heat of the fluid and to dissipate such heat which has a pair of countermoving rotors driven in opposite senses and cooperating to increase the interaction of the rotor vanes with the liquid above the relationship characteristic of a single rotor device.

According to a more specific feature of this invention, the rotors are coaxial with one another and have interfittable arrays of vanes, preferably extending axially toward one another, each of the arrays being made up of angularly equispaced vanes, the arrays being radially offset from one another with respect to the axis of the device. We have found that an arrangement in which counterrotating interfitting arrays of vanes form the pump assembly permits hydrodynamic braking to a high degree with a much more compact configuration of the assembly. Moreover, the assembly permits the heat-dissipating means to be formed integrally with the pump unit. To this end, we provide a heat-conductive housing around the rotor which defines therewith a heat-exchange chamber through which a coolant is induced to flow in heat-transferring relationship with the liquid circulated by the pumping rotors. Thus the device comprises blower means, advantageously driven by the rotating shaft structure, to induce the flow of air through the cooling jacket or heat exchanger. Control means is provided to intercept the circulating liquid.

BRIEF DESCRIPTION OF THE FIGURES

The above and other objects, features and advantages of the present invention will become more readily apparent from the following description, reference being made to the accompanying drawing, in which:

FIG. 1 is a diagram, partly in elevation, showing a hydrodynamic decelerator system embodying this invention; and FIG. 2 is a fragmentary cross-sectional view showing another rotor assembly for a hydrodynamic brake or decelerator according to this invention.

SPECIFIC DESCRIPTION

FIG. 1 is a diagram showing the relationship of the hydrodynamic brake system to the remainder of the vehicle. The vehicle is here represented as having an internal combustion engine 100 whose gear-change transmission 101 has a gear-shift lever 102 and is used in a heavy-duty automotive vehicle such as a truck. The output of the transmission 101 is a shaft 103 connected to the power shaft 104 by a universal joint 105 while another universal joint 106 connects the power shaft 104 to the input shaft 107 of a differential 108 whose output shafts 109 and 110 drive the rear wheels 111 and 112. The latter are shown to have hydraulically operated internal expanding brakes 113 and 114 supplied with brake fluid by transmission line 115 from a master cylinder 116; the master cylinder may also operate the hydraulic decelerator 117. The hollow shafts of the latter are connected with the shafts 118 and 119 which are driven in opposite senses by a bevel-gear transmission 120 and a spur-gear assembly 121.

The shafts carry respective pumping rotors generally designated which are driven by the rear wheels of the vehicle via the transmission described in connection with FIG. 1 in opposite senses or directions.

FIG. 2 shows a modified double-rotor hydrodynamic brake the shafts of which can be connected as shown in FIG. 1 and in which the stator housing 61 is of toroidal configuration and has a pair of axially extending opposite sleeves 61a and 61b carrying supporting bearings 62a and 62b in which a pair of axially extending splined shafts 63 and 64 are journaled. The shafts 63 and 64 are rotated in opposite senses as previously described. The toroidal chamber 65 (of annular section in an axial plane) within the housing 61 receives the rotors as will be apparent hereinafter. An array of stator blades 66 is mounted upon the inner wall of the housing 61 and is connected with an inner wall 67 which likewise extends toroidally around the axis A of rotation of the rotors. On the right-hand side of housing 61, there are provided arrays of interfitting generally axially extending blades 68, 69 and 70. The blades 69 are carried by a rotor body 71 in the form of a disk generally perpendicular to the axis A and mounted upon the shaft 64. The other rotor comprises a hub 73 which carries the angularly spaced vanes 68 to which the annular rotor shell 72 is attached. The vanes 68 and 70 are cantilevered on the shell 72. Thus the annular chamber 65 is formed around the torus axis X and the wall 67 to induce the pumping action of the fluid in the manner of an axially inlet, radial outlet pump. In the space between the vanes 68 and 70, the vanes 69 of the rotor 71 extend axially. The hub 73 is mounted upon an extension 63a of shaft 63 and has its free end rotatable relatively to the shaft 64 and journaled in a bearing 64 in the latter. Seals 75 and 76 prevent escape of the hydrodynamic brake fluid from the stator housing 61. A curved sheet metal strip 75' completes the annular or donut configuration (in section in an axial plane) of the chamber 65.

Within the space surrounded by wall 67, we provide a tubular slide 78 which has the configuration of a cylindrical ring and can be shifted in the direction of arrow Y along a screw thread 78a.

The slide 78 has an axially extending rim 78b which is designed to intercept the hydrodynamic fluid circulating through the annular chamber 10 when this rim projects into the circulating chamber through a window 82 in the wall 67. During such interception of the fluid, the liquid is conducted into the interior 78d of the toroidal chamber 67 where it assumes a quiescent condition and thereby reduces the effectiveness of hydrodynamic braking to a corresponding degree. Any convenient mechanism can be used to adjust the position of the member 78, such mechanism being represented as a bowden line 83 operated by a lever 84 at the driver's position in the vehicle. The outer edge of the vanes 70 may be parallel to the generatrices of the rim or inclined thereto outwardly from the window on 82.

To dissipate thermal energy from the device, the housing 61 is provided with a multiplicity of angularly equispaced radially extending fins 85 lying in respective axial planes of the device, and with a shell 86 surrounding the fins 85 so as to define coolant channels therewith. At the left-hand open end of the shell 86, we provide a blower arrangement to induce a flow of air in heat-exchanging relationship with the housing 61 and the liquid circulating therein. The blower arrangement comprises a fan 87 which is rotatably mounted by a bearing 93 upon the housing sleeve 61a and has an internal ring gear 88 meshing with the planetary gears 94 angularly equispaced about the axis A. The planetary gears 94 are rotatably mounted upon respective shafts 89 of a planetary-gear carrier keyed at 91 to the splined shaft 63. The sun gear 92 meshes with the planetary gears 94 and is fixed to the sleeve portion 61a of the housing 61. In the region of the hub (screw thread 78a) the wall 67 may have another window unblocked in the retracted position of slider 78 to permit liquid to return to chamber 65.

In operation, the slider 78 is withdrawn to the left in FIG. 2 to permit the counterrotating vanes 69 and 68, 70 to displace the liquid around the core chamber 67 through the chamber 65 without cavitation phenomena and with stepless adjustment of the flow cross section via member 78. The interaction of the resulting vortex with the vanes and the stator fins 66 generates heat in proportion to the degree of hydrodynamic braking, the heat being dissipated by the air flow through the channels between fins 85. The chamber 67 thus retains the noncirculating portion of the liquid and acts to prevent pumping when braking is not required. In addition, stepless regulation is provided, the unit is highly compact and makes use of a limited number of parts which may be adversely affected by heat. The chamber 65 can be designed and dimensioned to minimized cavitation and may have the conveniences and conventional torque-converter systems.

We claim:

1. A hydrodynamic brake for a vehicle having a body and wheel means, said hydrodynamic brake comprising housing means mounted on said body, a pair of cooperating rotors connected with said wheel means for rotation in opposite senses for circulating a hydrodynamic-brake liquid, and heat-exchanger means for dissipating heat developed in said liquid upon the braking of said wheel means, said rotors having interfitting annular arrays of vanes engaging said fluid, said housing means being of generally toroidal configuration and forming an annular pumping chamber of round section in an axial plane through said housing means, said hydrodynamic brake further comprising an annular slider surrounding said axis and having an axially extending rim axially shiftable into said chamber to intercept the liquid circulating therein, said housing means including a wall axially juxtaposed with said rim and cooperating therewith in a fully inserted position with said slider to completely block said chamber, a compartment within the toroid receiving said slider and provided with a slot open in the direction of said wall to clear said slider and admit said liquid to said compartment, and with an opening communicating between said compartment and said chamber remote from said slot to return the liquid to said chamber upon withdrawal of said slider said rim being disposed radially outwardly of the outermost one of said arrays of vanes, said slider and said housing means being formed within said compartment with mutually engaging screw thread means for axially displacing said rim toward said wall upon rotation of said slider.

2. A hydrodynamic brake as defined in claim 1 wherein said housing means is formed with ribs, said heat-exchanger means including a shell closely surrounding said ribs and forming coolant channels therewith, and blower means operatively connected with one of said rotors for inducing a flow of air through said channels.

3. A hydrodynamic brake as defined in claim 2, further comprising planetary gear means coupling said one of said rotors with said blower means.